(12) United States Patent
Sharma et al.

(10) Patent No.: US 8,195,931 B1
(45) Date of Patent: Jun. 5, 2012

(54) APPLICATION CHANGE CONTROL

(75) Inventors: Rosen Sharma, Los Gatos, CA (US);
Rishi Bhargava, San Jose, CA (US);
Chiradeep Vittal, Sunnyvale, CA (US);
Shyam Eranky, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 803 days.

(21) Appl. No.: 12/290,380

(22) Filed: Oct. 29, 2008

Related U.S. Application Data

(60) Provisional application No. 61/001,449, filed on Oct. 31, 2007.

(51) Int. Cl.
*G06F 9/00* (2006.01)
(52) U.S. Cl. .......................... 713/100; 709/221
(58) Field of Classification Search .................. 713/100; 703/21, 22; 709/221; 726/22
See application file for complete search history.

(56) References Cited

U.S. PATENT DOCUMENTS

| | | | |
|---|---|---|---|
| 4,688,169 A | 8/1987 | Joshi | |
| 4,982,430 A | 1/1991 | Frezza et al. | |
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,349 A | 7/1998 | Okonogi | |
| 5,787,427 A | 7/1998 | Benantar et al. | |
| 5,842,017 A | 11/1998 | Hookway et al. | |
| 5,907,709 A | 5/1999 | Cantey et al. | |
| 5,974,149 A | 10/1999 | Leppek | |
| 5,987,611 A | 11/1999 | Freund | |
| 5,991,881 A | 11/1999 | Conklin et al. | |
| 6,141,698 A | 10/2000 | Krishnan et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |

(Continued)

FOREIGN PATENT DOCUMENTS

EP   1 482 394 A2   12/2004

(Continued)

OTHER PUBLICATIONS

Kurt Gutzmann, "Access Control and Session Management in the HTTP Environment," Jan./Feb. 2001, pp. 26-35, IEEE Internet Computing.

(Continued)

*Primary Examiner* — Albert Wang
(74) *Attorney, Agent, or Firm* — Patent Capital Group

(57) ABSTRACT

A change management system for and method of change management control, monitoring, and analysis is disclosed. A change management system comprises a means for generating configuration item change information, and a means for processing configuration item change information for logical system groups according to an information structure. The information structure for the logical groups is comprised at least one of change rule information for the configuration items, interrelationship information between the configuration items and the system components, interrelationship information between system components. The method can be used as a monitoring tool for determining the effect of configuration changes. The configuration item change information is analyzed according to an information structure which comprises at least one of information structure that defines one or more configuration item change rules, interrelationship information between the at least one configuration item and one or more system components, and interrelationship information between one or more system components.

22 Claims, 4 Drawing Sheets

U.S. PATENT DOCUMENTS

| | | |
|---|---|---|
| 6,275,938 B1 | 8/2001 | Bond et al. |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,587,877 B1 | 7/2003 | Douglis et al. |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,346,781 B2 | 3/2008 | Cowle et al. |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,170 B2 | 3/2009 | Finnegan |
| 7,546,333 B2 * | 6/2009 | Alon et al. ............... 709/200 |
| 7,607,170 B2 | 10/2009 | Chesla |
| 7,657,599 B2 | 2/2010 | Smith |
| 7,698,744 B2 | 4/2010 | Fanton et al. |
| 7,757,269 B1 | 7/2010 | Roy-Chowdhury et al. |
| 7,870,387 B1 | 1/2011 | Bhargava et al. |
| 7,908,653 B2 | 3/2011 | Brickell et al. |
| 7,937,455 B2 | 5/2011 | Saha et al. |
| 8,015,563 B2 | 9/2011 | Araujo et al. |
| 2002/0069367 A1 | 6/2002 | Tindal et al. |
| 2002/0083175 A1 | 6/2002 | Afek et al. |
| 2002/0099671 A1 | 7/2002 | Mastin Crosbie et al. ..... 705/500 |
| 2003/0023736 A1 | 1/2003 | Abkemeier |
| 2003/0073894 A1 | 4/2003 | Chiang et al. |
| 2003/0074552 A1 | 4/2003 | Olkin et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0167399 A1 | 9/2003 | Audebert et al. |
| 2004/0003258 A1 | 1/2004 | Billingsley et al. |
| 2004/0015554 A1 | 1/2004 | Wilson ............... 709/206 |
| 2004/0051736 A1 | 3/2004 | Daniell |
| 2004/0054928 A1 | 3/2004 | Hall |
| 2004/0143749 A1 | 7/2004 | Tajalli et al. |
| 2004/0167906 A1 | 8/2004 | Smith et al. |
| 2004/0230963 A1 | 11/2004 | Rothman et al. |
| 2004/0243678 A1 | 12/2004 | Smith et al. |
| 2004/0255161 A1 | 12/2004 | Cavanaugh ............... 713/201 |
| 2005/0018651 A1 | 1/2005 | Yan et al. ............... 370/352 |
| 2005/0108562 A1 | 5/2005 | Khazan et al. |
| 2005/0114672 A1 | 5/2005 | Duncan et al. |
| 2005/0228990 A1 | 10/2005 | Kato et al. ............... 713/167 |
| 2005/0235360 A1 | 10/2005 | Pearson |
| 2005/0257207 A1 | 11/2005 | Blumfield et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2006/0004875 A1 * | 1/2006 | Baron et al. ............... 707/200 |
| 2006/0015501 A1 | 1/2006 | Sanamrad et al. |
| 2006/0037016 A1 | 2/2006 | Saha et al. |
| 2006/0080656 A1 | 4/2006 | Cain et al. |
| 2006/0085785 A1 | 4/2006 | Garrett |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0195906 A1 | 8/2006 | Jin et al. |
| 2006/0236398 A1 | 10/2006 | Trakic et al. |
| 2007/0011746 A1 | 1/2007 | Malpani et al. |
| 2007/0039049 A1 | 2/2007 | Kupferman et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0169079 A1 | 7/2007 | Keller et al. |
| 2007/0192329 A1 | 8/2007 | Croft et al. |
| 2007/0253430 A1 | 11/2007 | Minami et al. |
| 2007/0271561 A1 | 11/2007 | Winner et al. |
| 2008/0005798 A1 | 1/2008 | Ross |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0163207 A1 | 7/2008 | Reumann et al. |
| 2008/0163210 A1 | 7/2008 | Bowman et al. |
| 2008/0184373 A1 | 7/2008 | Traut et al. |
| 2008/0294703 A1 | 11/2008 | Craft et al. |
| 2008/0301770 A1 | 12/2008 | Kinder |
| 2009/0038017 A1 | 2/2009 | Durham et al. |
| 2009/0144300 A1 | 6/2009 | Chatley et al. |
| 2009/0150639 A1 | 6/2009 | Ohata |
| 2009/0249438 A1 | 10/2009 | Litvin et al. |
| 2010/0100970 A1 | 4/2010 | Chowdhury et al. |
| 2010/0114825 A1 | 5/2010 | Siddegowda |
| 2010/0281133 A1 | 11/2010 | Brendel |
| 2010/0293225 A1 | 11/2010 | Sebes et al. |
| 2011/0035423 A1 | 2/2011 | Kobayashi et al. |
| 2011/0077948 A1 | 3/2011 | Sharma et al. |
| 2011/0093842 A1 | 4/2011 | Sebes |
| 2011/0093950 A1 | 4/2011 | Bhargava et al. |
| 2011/0119760 A1 | 5/2011 | Sebes et al. |
| 2011/0138461 A1 | 6/2011 | Bhargava et al. |

FOREIGN PATENT DOCUMENTS

| | | |
|---|---|---|
| EP | 2 037 657 A1 | 3/2009 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |

OTHER PUBLICATIONS

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 11/277,596, entitled "Execution Environment File Inventory," filed Mar. 27, 2006, Inventor(s): Rishi Bhargava et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/122,872, entitled "Piracy Prevention Using Unique Module Translation," filed May 4, 2005, Inventor(s): E. John Sebes et al.

U.S. Appl. No. 11/182,320, entitled "Classification of Software on Networked Systems," filed Jul. 14, 2005, Inventor(s): E. John Sebes et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/551,673, entitled "Piracy Prevention Using Unique Module Translation," filed Sep. 1, 2009, Inventor(s): E. John Sebes et al.

Barrantes et al., "Randomized Instruction Set Emulation to Disrupt Binary Code Injection Attacks," Oct. 27-31, 2003, ACM, pp. 281-289.

Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.

Gaurav et al., "Countering Code-Injection Attacks with Instruction-Set Randomization," Oct. 27-31, 2003, ACM, pp. 272-280.

IA-32 Intel® Architecture Software Developer's Manual, vol. 3B; Jun. 2006; pp. 13, 15, 22 and 145-146.

Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.

Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 11/060,683, entitled "Distribution and Installation of Solidified Software on a Computer," Filed Feb. 16, 2005, Inventor(s): Bakul Shah et al.

U.S. Appl. No. 11/379,953, entitled "Software Modification by Group to Minimize Breakage," filed Apr. 24, 2006, Inventor(s): E. John Sebes et al.

U.S. Appl. No. 11/437,317, entitled "Connectivity-Based Authorization," filed May 18, 2006, Inventor(s): E. John Sebes et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/636,414, entitled "System and Method for Managing Virtual Machine Configurations," filed Dec. 11, 2009, Inventor(s): Harvinder Singh Sawhney, et al.

U.S. Appl. No. 12/844,892, entitled "System and Method for Protecting Computer Networks Against Malicious Software," filed Jul. 28, 2010, Inventor(s) Rishi Bhargava, et al.

U.S. Appl. No. 12/844,964, entitled "System and Method for Network Level Protection Against Malicious Software," filed Jul. 28, 2010, Inventor(s) Rishi Bhargava, et al.

U.S. Appl. No. 12/880,125, entitled "System and Method for Clustering Host Inventories," filed Sep. 12, 2010, Inventor(s) Rishi Bhargava, et al.

U.S. Appl. No. 12/903,993, entitled "Method and System for Containment of Usage of Language Interfaces," filed Oct. 13, 2010, Inventor(s) Rosen Sharma, et al.

U.S. Appl. No. 12/946,344, entitled "Method and System for Containment of Usage of Language Interfaces," filed Nov. 15, 2010, Inventor(s) Rosen Sharma, et al.

U.S. Appl. No. 13/012,138, entitled "System and Method for Selectively Grouping and Managing Program Files," filed Jan. 24, 2011, Inventor(s) Rishi Bhargava, et al.

U.S. Appl. No. 13/037,988, entitled "System and Method for Botnet Detection by Comprehensive Email Behavioral Analysis," filed Mar. 1, 2011, Inventor(s) Sven Krasser, et al.

* cited by examiner

200

```
<Applense group = "division" name = "finance">
    <logical group 1>
        <system component 1>
            <file>
                C:\prog\oracle.exe track=yes severity =high Preservation = "yes"    } 220
                User = "no" time = "2 pm"
            </file>
            <reg>
                <key name>
                    name = "license"  track=yes severity =high Preservation = "yes"
                    User = "admin" time = "2 pm to 4 pm"
                </key_name>
                <key value>
                    value = locked
                </key value>
            </reg>
        </system component 1>
        <external>
            <service >
                database = financial severity=high
            </service>
            <server>
                name = "Sun" severity=high
            </server>
        </external>
    </logical group 1>
    <logical group 2>
        <external>
            <service >
                database = Oracle severity=high
                program = "financal"
            /service>
            <server>
                name = "Sun" severity=high
            </server>
        </external>
    </logical group 2>
</Applense>
```

APPLICATION CHANGE CONTROL

RELATED APPLICATIONS

This application claims benefit of priority under 35 U.S.C. section 119(e) of U.S. Provisional Patent Application Ser. 61/001,449 filed Oct. 31, 2007, entitled APPLICATION CHANGE CONTROL which is incorporated by reference.

FIELD OF THE INVENTION

The invention relates to a method of and system for change management control, analysis, and monitoring of logical groups including of system components and configuration items. The change management is based on configuration item change information generated by configuration item monitoring devices. The change information is analyzed against configuration item change rules, and interrelationship information between configuration items, system components, and between system components.

BACKGROUND OF THE INVENTION

Current state-of-the-art configuration management systems are based on, names of a file, creation dates of files, registries, and environment variable within an application or a suite of applications. However, these relationships are limited in only defining a relationship between components within an application, or a suite of applications.

What is needed is a method of defining change relationships in a manner that extends beyond an application component relationship to include the additional dimension of change and rules for changing configuration items including but not limited to time a change was made, the user making the change, the content of the change, and the impact of a change. Additionally, what is needed is the ability to correlated multiple change management specifications defining different system viewpoints. Further needed is a change control system where the integral relationship, logical groups of system components and configuration items can be specified for which configuration item change information can be utilized for management, control, monitoring, and analysis. What is also is needed is a configuration management system does not define relationships in terms of the configuration change dimensions such as time when a change can be made, the change value, the program that made the change, the user that made the change, the severity of a change and the analysis of a change from multiple viewpoints.

SUMMARY OF THE INVENTION

A first aspect of the invention is a system for change management. The system includes means of generating configuration item change information, an information structure that defines change rules for configuration items including relationships between system components, and means for processing the configuration item change information according to the information structure.

The means for generating configuration item change information can be but is not limited to software operating as an application, process, driver, or a software hook into an operating system. This means of generating configuration item change information can monitor, control by the prevention or timing of changes, and generate configuration item change information that can include but is not limited to the status of the change, the time of the change, the process making the change, and the user making the change, or a reason for failure of a change.

The information structure describes the configuration items that can be part of a system, a logical group or a combination of the two. Further, the information structure describes change rules for configuration items, system components, logical groups, or a combination thereof. A change rule can apply to a single configuration item, a plurality of configuration items, a system component, a logical group, or a combination thereof. Additionally, the information structure contains interrelationship information of a configuration item with one or more system components, and interrelationship information between system components.

The system includes means for interpreting the configuration item change information according to the information structure. This means for interpreting the configuration item change information can include but is not limited to determining if the configuration change violated a rule. This step can include interpretation of change failures. The means of interpretation also includes mapping of a change in a configuration item to a system component where the system component is part of a logical group defining a system view.

In one embodiment of the invention, the system comprises a plurality of system components where each system component comprises one or more configuration items. Exemplar of configuration items are computer files, computer registries, databases, and can include configuration of mechanical devices. Exemplar of system components are computer applications, a computer system, computational logic, a configurable mechanical device, a network device, a storage array, a server, server cluster, and a processing center.

In a further embodiment, the invention comprises of one or more logical groups consisting of at least one system component and a configuration item. These logical groups can have overlapping system components and overlapping configuration items.

In one aspect of the invention, the system further comprises means for generating a notification of the changes in the configuration items when the configuration item change information is processed in accordance with the information structure. This notification can include but is not limited to violations of the change rules in the information structure. Further, the notification can report the status of changes. The means for notification can include but is not limited to the generation of reports, email, SMS text messages, pages, SNMP (Simple Network Management Protocol) messages, and automated phone messages. SNMP messages can be generated by calling the Network Management TRAP function which generates an interne or interprocess communication message. The message can contain information or an indication regarding the cause of the TRAP invocation. Other standard or custom network management protocols are also contemplated. A socket can be setup for interprocess or inter-computer communication of the notifications.

In another embodiment of the system for change management, an indicator is provided as part of the interrelationship information of the information structure which characterizes the relative importance of the change between a configuration item and the one or more system components. Additionally, the information structure can contain an indicator that characterizes the importance of the interrelationship between other components. The indicators provide a relative effect of a change on the logical group system component or configuration item. Exemplary of such an indicator are the use of values between 1 and 10, or the use of words such as "slight", "moderate", and "severe."

In another embodiment of the system, the means for generating configuration item change information is an application coupled to a least one of the system components or configuration items. This application can be, but is not limited to, a program operating as an application, process, driver, or hook into an operating system. This application can monitor, control configuration item changes, and generate configuration item change information that can include but is not limited to the status of the change, the time of the change, the process making the change, and the user making the change. Also contemplated is monitoring at a system or logical group level.

In yet another embodiment of the system, the configuration items comprise one or more computer files, computer registries, databases, virtual machine settings, or a combination thereof.

In another embodiment of the system, configuration item change information provides information on a file creation, a file deletion, file change data, registry creation, registry deletion, the registry change value, change of a virtual machine setting, a database change, a user making the change, a time of the change, a program making the change, an operational program making the change, or a combination thereof.

In a second aspect of the invention, a method of change management disclosed. The method comprises the steps of generating change information and processing the change information according to the logical groups, system components, or configuration items specified in an information structure. The information structure contains information change rules for configuration items, system components, and logical groups. Further, the information structure contains information on the interrelationship between a configuration item within a logical group and system components. Further it can include relationships between a configuration item and another configuration item. For example, a financial program might be dependent on a database system component where the general dependency is known but not down to a fine grain level such as whether the program is dependent on a specific table in a database application. Additionally, the information structure contains information on the interrelationship between system components and between logical groups. These system components can reside within the same logical group or outside the logical group.

In a further embodiment of the second aspect of the invention, the method further comprises the step of generating one or more notifications according to the processing of the change information in accordance with the information structure. The notifications can include but are not limited to generating, a text or graphic report, an email, an SMS text message, a page, a SNMP (Simple Network Management Protocol) message, an automated phone message, or a combination thereof. SNMP messages can be generated by calling the Network Management TRAP function which generates an internet or interprocess communication message. The message can contain information or an indication regarding the cause of the TRAP invocation.

In another embodiment of the method of change management, the information structure change rules used in the processing of the change data comprise at least one parameter selected from the group consisting of users that can make the configuration change, programs allowed to make the configuration change, a time window during which the change can be made, allowable data for the change, or a data range for the change, and any combination thereof.

In yet another embodiment of the method of change management, the processing of change information utilizes an indicator associated with interrelationship information between the at least one or more of the configuration items, other configuration items and the system components, and an indication the interrelationship information between the system component and a second system component to characterize the effect of the change information on the logical group. Further it can contain an indication of the interrelationship information between logical groups.

In yet another embodiment of the method of change management, the configuration items are selected from the group consisting of files, registries, databases, virtual machines, and a combination thereof. Configuration item change information comprises, file creation, file deletion, file data, registry creation, registry deletion, a registry change value, change of a virtual machine setting, a virtual machine setting, a database change, a user who made the change, a time of the change, a program making the change, or a combination thereof. The method for generating the change information can be a change monitoring application coupled to at least one of the configuration items and one of the system components. The change monitoring application can be a program, process, or a component of an operating system.

In another embodiment of the method of change management, the means for generating change information further controls changes to the configuration items in accordance with one or more configuration parameters. The configuration parameters can specify but are not limited to the time of the configuration change, the program making the change, the user making the change, or a range of change values.

In another aspect of the invention, a change management analysis system is disclosed. The system comprises means of generating simulated configuration item change information, an information structure, and a means of processing the configuration item change information for one or more logical groups, system components, or configuration items according the information structure. The information structure contains logical groups of system components and configuration items. Each logical group comprises at least one of change rule information for at least one configuration item, interrelationship information between the configuration item(s) and one or more system components, and interrelationship information between system components. Also, the system components can contain at least one change rule. Means of generating simulated configuration item changes can include an application that allows a user to select one or more changes to a configuration item or a system component specified within the information structure. Means of processing the simulated configuration item changes by logical groups or system components and provides changes in accordance to the information structure. The inventor contemplates any type of processing system including but not limited to servers, blade processors, personal computers, and mobile computational devices.

A third aspect of the invention is for a method of generating an information structure. The information structure comprises one or more logical groups containing a least change rule information for the at least one configuration item, interrelationship information between a configuration item and a system component, or interrelationship information between two system components. Further, the information structure can include change rule information for one or more system components. A method of generating an information structure includes the steps of processing a plurality of logical group information structures describing a logical group. One or more system components or configuration items. The processing determines the associations between each logical group. The information structure comprises at least one of change rule information for the at least one configuration item, interrelationship information between the at least one configuration item and one or more system components, and interrelationship information between one or more system components. The processing generates an information structure including a plurality of logical groups or system components. Each logical group contains at least one element selected from the group of change rule information for the at least one configuration item, interrelationship information between the at least one configuration item and one or more system components, and interrelationship information between one or more system components. Alternatively, the information structure can contain system components that contain at least one element selected from the group of change rule information for the at least one configuration item, interrelationship information between the at least one configuration item and interrelationship information between one or more system components.

BRIEF DESCRIPTION OF THE DRAWINGS

The invention is better understood by reading the following detailed description of an exemplary embodiment in conjunction with the accompanying drawings.

FIG. 2 illustrates an information structure identifying logical groups of configuration items and interrelationships between system components and interrelationships between system components and configuration items.

DETAILED DESCRIPTION OF THE INVENTION

The following description of the invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptions to the present inventions are possible and may even be desirable in certain circumstances, and are a part of the present invention. Thus, the following description is provided as illustrative of the principles of the present invention and not in limitation thereof. The scope of the present invention is defined by the claims.

The present invention provides multiple advantages over the prior art. Configuration item change management can be used to manage, control, monitor, and analyze the consequence of changes over a more complex systems than can be implemented with the current state-of-the-art systems. Also, the management, control, monitoring, and analysis of the system components and configuration items can be tailored to logical group, system components, and configuration items to match differing interests. This abstracts the monitoring and analysis and removes the fine grain reporting of configuration item changes that might be difficult to interpret. Further, the system management can be performed based on relationships other than that a configuration item belongs to a group of configuration items. Relationships between system elements can also include relationships between system components and other system components and configuration items. Complex management relationships can be created, monitored, and or controlled. The management can be based on the creation, deletion, and change value of a file, registry, environment variable, or database. Additional change parameter rules can be included in the change management system including the control of or monitoring or the user making the change, the program making the change, the server making the change, the server cluster making the change, or even changes to a virtual machine. As a result, the effect of fine grain changes can be controlled, analyzed and monitored, and the effects reported at an abstraction level consistent with a the interest, control, and responsibility.

Figure 1:
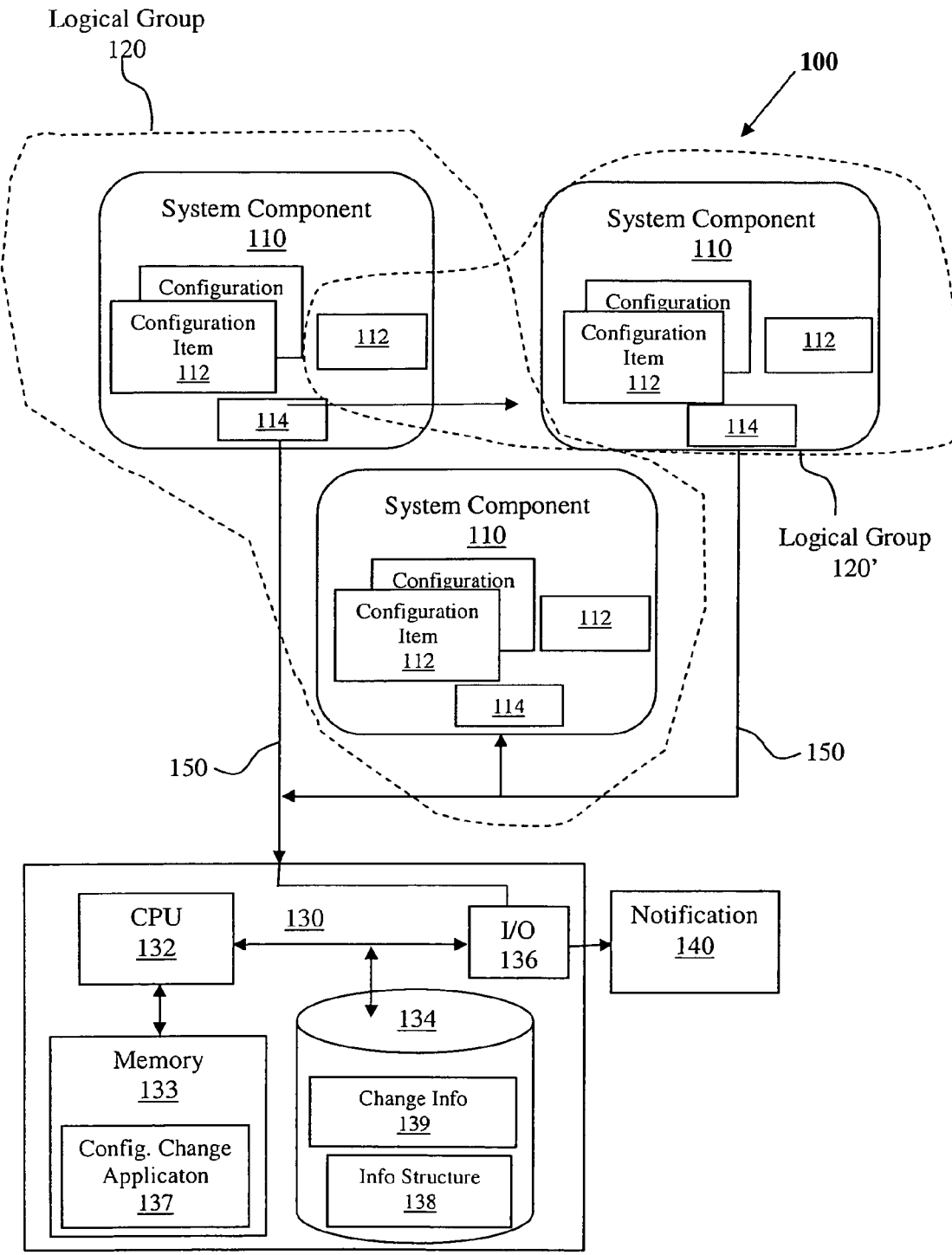
FIG. 1 illustrates a system for control and monitoring change management comprising system components, configuration items, and a change management server where logical groups of system components and configuration items are identified and change information is processed.

FIG. 1 is exemplary of a change management system 100. The system comprises a plurality of system components 110, coupled to a means for receiving change information 130 over a communication means 150. The system components 110 comprise one or more configuration items 112, and means for capturing and forwarding configuration item change information 114 to means for processing change information 130. Groups of system components 110 and individual configuration items 112 can form logical groups, 120, 120'.

A system component 110 can comprise one or more configuration items 112. Exemplar of a system component 110 is a computer application, a computer, computational logic, a configurable mechanical device, a network device, a storage array, a server, server cluster, or a processing center. Configuration items 112 include but are not limited to files, databases, registries, environment variables, virtual machine settings, or mechanical valve settings. The system component 110 also includes a configuration change controller 114 which monitors or controls a change in a configuration item 112. The change controller 114 can include but is not limited to a software program or other programmable logic coupled or integrated into to an operating system to monitor, prevent, or control changes to configuration items such as files, registries, and databases. The Non-Provisional Patent Application "Method and Apparatus for Process Enforced Configuration Management" filed Jan. 9, 2008 to Rishi Bhargava et al and the Provisional Patent Application Ser. No. 60/879,826 filed Jan. 10, 2007, and entitled "SOFTWARE THAT MESSAGES CHANGE CONTROL" is are hereby incorporated by reference in their entirety.

The change controller 114 generates informational messages regarding changes or attempted changes to configuration items 112 and controls access to the configuration item. These messages can contain information about but are not limited to, the program that made the change, the values that were changed, the time of the change, the user making the change, the computer/server/cluster from which the change was made, and the database being used. These messages are sent to configuration change server 130 which provides means for processing and analyzing configuration changes according to an information structure 138. The information structure can contain one or more change rules and information on interrelationships between two or more system components 110 and interrelationships between system components 110 and configuration items 112. The change management application 137 is shown as a part of separate server 130. Also within the contemplation of the invention is the configuration change application 137 running on a computer/servers with other applications or within a virtual machine running on a computer (not shown) and shared with other applications.

The change controller 114 and the configuration change server 130 are illustrated as being coupled by a network 150. Other means of communication are also contemplated. Communication between the change controller 114 and the configuration change application 137 can use but is not limited to operating system sockets, pipes, and all types of wired, optical, and wireless networks.

The change configuration server 130 includes a central processing unit (CPU) 132, program memory 133, a non-volatile storage 134, and input and output logic 136 for communication with the change controller 114 and notification means 140. The change configuration server 130 provides means for processing change information received over the network 150 and/or storing for the change information on the non-volatile storage 134. The change information is processed according to the rules and relationships specified in the information structure 138. While depicted as a separated processing unit, the configuration change server 130 can be part of a server providing other functions such as a file server or an application server. Also contemplated by the invention, is the use of other computational systems for implementing a change configuration server including but not limited to blade servers, desktop computers, thin clients, or other computational devices.

The non-volatile system 134 is depicted as part of the change configuration server 130 but other configurations of non-volatile memory are contemplated. The storage device can 134 be externally coupled or can be network attached storage (not shown). Stored within the storage system is configuration change information received from the configuration change controllers 114 over the network 150. However, it is within the contemplation of the invention for the configuration change information to be directly processed by the CPU without storage on non-volatile storage 134. The storage device 130 also contains an information structure 138 containing information regarding rules for changes to configuration items 112, configuration relationships between configuration items 112 and other configuration items 112, a configuration relationships between configuration items 112 and system components 110, and configuration relationships between system components 110.

A set of one or more rules and relationships form a logical group which represents one view of a system. The information structure 138 can contain multiple logical groups 120, 120'. A logical group 120, 120' forms an exemplary view of the system that contains the system components 110 and configuration items 112 in which a person or organization can be interested. For example, a CFO might be concerned with whether anything in the financial accounting system changed during the year-end closing. In this example, the CEO logical group may be limited to the Oracle® accounting software, the finance cluster of servers, and the Oracle® database components. Alternatively, the interest of the manager for the Oracle® database could be limited to the database configuration items and all of the hardware on which the database runs with could involve other servers. This would form a different logical group than the logical group for the CFO. Note that the logical groups 120, 120' can overlap in their system components 110 and configuration items 112.

FIG. 2 is exemplar of an information structure 200, 134-FIG. 1, representing the configuration item change rules 220, and system component interrelationship with the logical group 240 for one or more logical groups 210. The information structure 200 can be used in multiple ways. In one application, the information structure 200 is used in the analysis of configuration item change information 139-FIG. 1 to determine the effect of configuration item changes on the logical groups 210,120-FIG. 1. This determination can include the detection of violation of the configuration item change rules 220.

Figure 3:
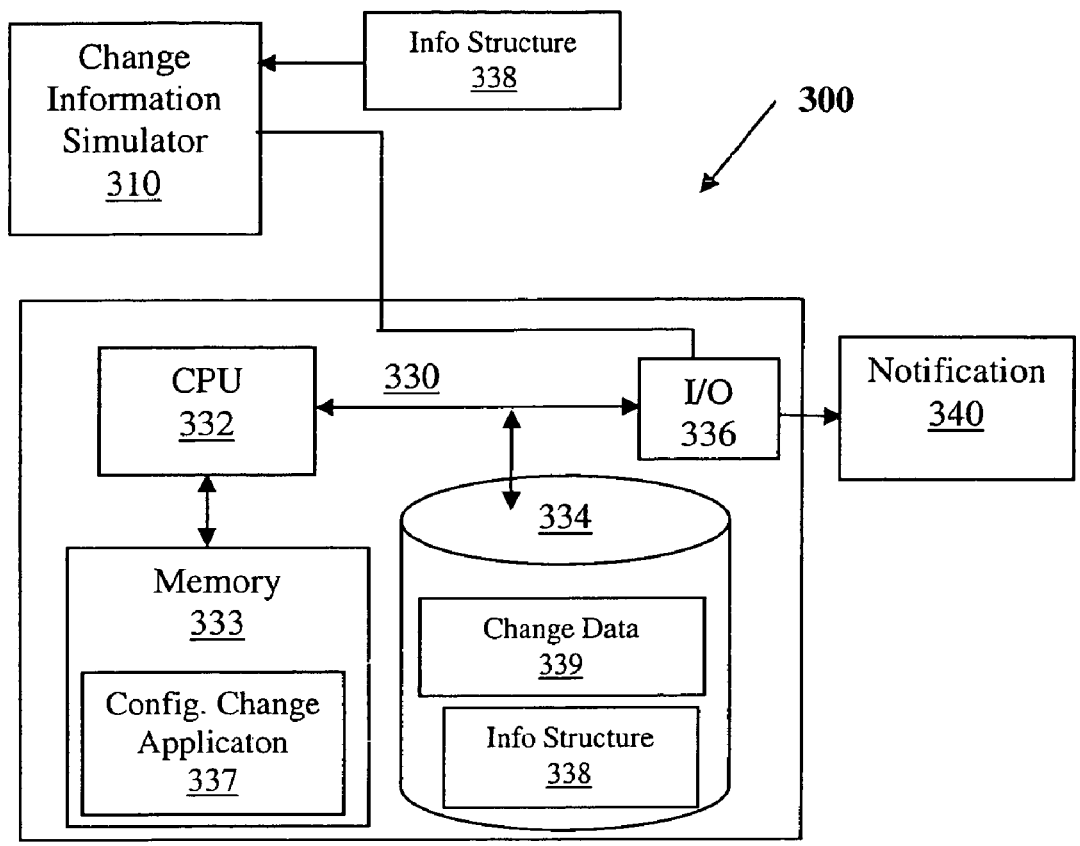
FIG. 3 illustrates a system for analyzing the effect of changes to configuration items based on an information structure with simulated configuration item change information.

In another utilization of the information structure 200, simulated configuration item change information 339-FIG. 3 is generated to determine the effect of a change of the different logical groups 210, 120-FIG. 1. Generated simulated configuration change information is input into a means for processing change information 330-FIG. 3. The means for processing change information 330-FIG. 3 processes the information as if it was generated by actual change monitoring devices 114-FIG. 1.

A third utilization of the information structure 200 is used to control configuration changes in the configuration items 112-FIG. 1 by configuration of the means for controlling and reporting configuration changes 114-FIG. 1. This means can enforce change policies of when and by whom a change can be made.

Within the logical group 210, the configuration items 220 shown include but are not limited to files, environment variables, and registry settings. Parameters are associated with each configuration item. The parameters can specify limitations to the configuration changes including but not limited to, a time window in which the change can be made, the users allowed to make the change, the programs allowed to make the change, and a range of values for the change. A logical group can also include an external system components 240 which interrelates with another logical group 210. The interrelationship with the external system components can include but is not limited to, a processor rebooting, a new version of a database, a change in any component of the database, and a change in the operating system. These interrelationship reflects a dependency at a higher level as oppose to a dependancy at the level of files, and registry settings. The exemplary information structure 200 is shown using a language like extendable markup language (XML) to describe the rules for two different logical groups. However, other description languages or means for defining information structures are contemplated.

FIG. 3 is exemplary of a change management analysis system. The system comprises a configuration item change simulator 310, coupled to a means for processing change information 130. The configuration item change simulator 310 generates simulated configuration change information that would be generated by a change monitoring device 114-FIG. 1 monitoring configuration items and system components as described in the information structure 338. The configuration items are specified in the change information structure 338. Groups of system components 110 and individual configuration items 112 can form a logical groups, 120, 120'-FIG. 1. This information structure 338 can be used as an input to the simulator for generating menus and selection choices for the simulation.

The change configuration server 330 includes a central processing unit (CPU) 332, and program memory 333, and a non-volatile storage means 334, and input and output logic 336 for communication with the configuration change application 337, the change information simulator 310 and the means for notification 140. The change configuration server 330 functions as described above in 130-FIG. 1. While the change configuration server 330 is shown as a separate processing system, the change configuration server 330 can be an application or process in a system component providing other functionality. This functionality can include but is not limited to other processing such as a file or application server.

Figure 4:
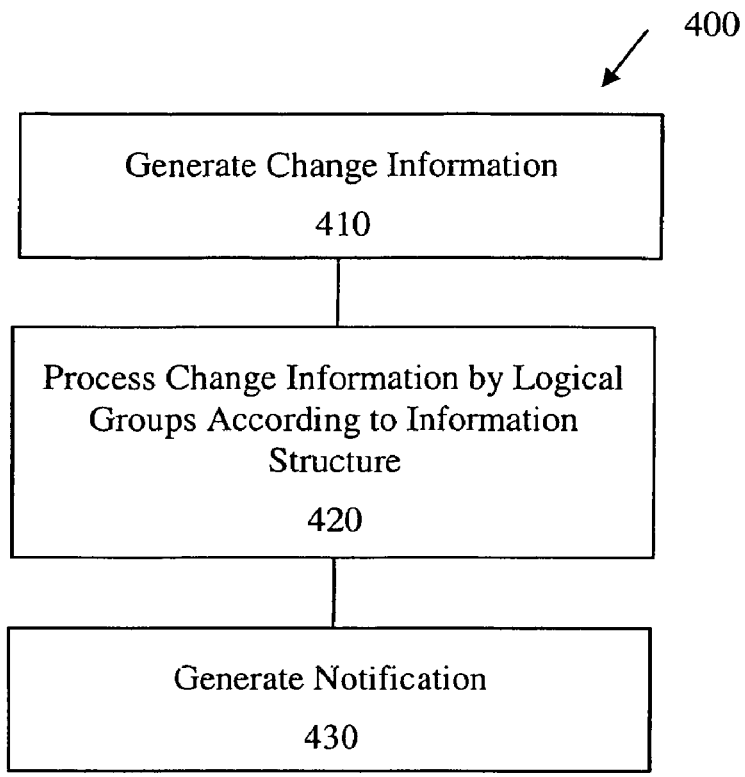
FIG. 4 illustrates a method of control and monitoring change information.

FIG. 4 illustrates the major steps 400 of one embodiment of the invention for change management. In a first step 410, configuration item change information is generated. The generation of change information can be provided by a monitoring application coupled to a configuration item or system component. As discussed above for the means for controlling and reporting configuration changes 114-FIG. 1, can be an application, a computer process, or an extension added to the operating system. The change information can include error messages reporting that a configuration change has failed because of a violation of a change rule configured into monitoring applications 114-FIG. 1 or a problem with the configuration item 112-FIG. 1 or the system component 110-FIG. 1.

The change information is sent to a central place for aggregation and analysis. The information can be sent over any communication means including but not limited wired networks, wireless networks or through computer software communication channels such as sockets, pipes, and shared memory.

The configuration change items include but are not limited to files, registry directory settings, databases, virtual machine settings, processor reboot, and process spawning and death. The types of changes tracked include but are not limited to file creation, file deletion, file data, registry creation, registry deletion, a registry change value, a virtual machine setting change, a virtual machine setting value, a database change, a user making a change, a time of the change, a program making the change, and any combination thereof.

In a second step 420, the change information is processed according to an information structure 138-FIG. 1. The processing can be to monitor configuration changes to one or more logical groups or to simulate the effect of a configuration item change through a simulated configuration item change. Further, the processing 420 can include using the information structure (138-FIG. 1) to configure the change controllers 114-FIG. 1 to control configuration changes to the configuration items 112-FIG. 1.

In a step 430, notifications are generated from the processing of the change information data (139-FIG. 1) or the simulated change information data (139-FIG. 2). The result of the processing of the change information data can be sorted by logical group to provide views of the system according to the preferences of different users and different organizations.

Figure 5:
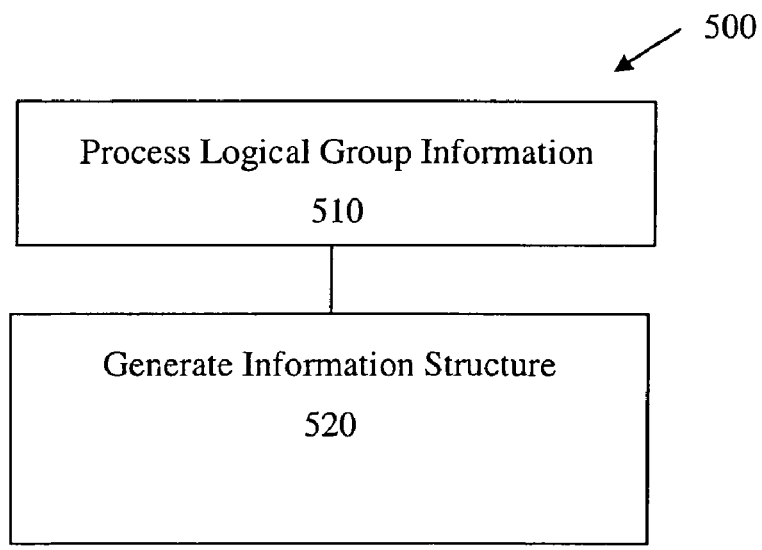
FIG. 5 illustrates a method of generating an information structure from a plurality of logical group information structure.

FIG. 5 illustrates the major steps 500 of one embodiment of the generation of an information structure from a plurality of logical group and system component information structures. The logical group and system component information structures can contain change rule information for the configuration items, interrelationship information between the at least one configuration item and one or more system components, interrelationship information between one or more system components and information between system component and configuration items.

In a first step 510, a plurality of logical group information structures is processed to determine the associations between the logical groups. As an example of these associations, one logical group may have specified a dependency on a first application. The first application may be dependent on another system component or configuration items that is not part of the logical group. As part of the generation of logical groups dependencies, these sub-dependencies are determined for incorporation into the information structure and associated with the logical groups. A complete tree of dependencies can be determined and incorporated into the information structure for each logical group.

In a second step 520, an information structure is generated from the dependencies determined in the processing step 510. The information structure can contain information for a plurality of a logical group or system components. For each logical group, the information structure will contain at least one of; a change rule for one or more configuration items, interrelationship information between at least one configuration item and one or more system components, interrelationship of a system group a one or more configuration items, and interrelationship information between one or more system components. For each system component, the information structure will contain at least one of; a change rule for one or more configuration items, interrelationship information between at least one system component and one or more configuration items, and interrelationship information with one or more system components. Preferably, this information structure is stored on a non-volatile memory device such as but not limited to a hard drive or flash memory 134-FIG. 1. This information structure is configured to be used by the means for processing configuration change data 130-FIG. 1. The information structure can be stored in an XML format but other data formats are contemplated.

What is claimed is:

1. An apparatus comprising:
   a program memory for storing data; and
   a central processing unit operable to execute instructions associated with the data, wherein the central processing unit and the program memory cooperate, such that the apparatus is configured for:
   receiving change information for a configuration item associated with a system component; and
   processing the change information according to an information structure, comprising:
   a logical group associated with at least one of: the configuration item and the system component;
      change rule information for the configuration item;
      interrelationship information between the configuration item and a second configuration item;
      change rule information for the system component;
      interrelationship information between the configuration item and the system component;
      interrelationship information between the system component and a second system component;
      change rule information for the logical group; and
      interrelationship information between the logical group logical group,
   comprises a selected one of a group of activities, the group consisting of:
   (a) monitoring configuration changes to the logical group;
   (b) simulating a change to the configuration item according to the change information; and
   (c) using the information structure to configure one or more change controllers to control changes to the configuration item according to the change information.

2. The apparatus of claim 1, further comprising one or more system components and one or more configuration items, wherein each system component comprises one or more configuration items.

3. The apparatus of claim 2, wherein each logical group consists of one or more system components, and one or more configuration items, wherein each system component comprises at least one configuration item.

4. The apparatus of claim 1, wherein the apparatus is further configured for: generating one or more notifications when the change information is processed according to the information structure.

5. The apparatus of claim 4, wherein the notification includes at least one of a report, an email, an SMS text message, a page, an SNMP message, and an automated phone message.

6. The apparatus of claim 1, wherein the change rule information comprises parameters for at least one of: an authorized user, an authorized program, a time window, and a data value.

7. The apparatus of claim 1, wherein the interrelationship information between the configuration item and the system component, and the interrelationship information between the system component and the second system component further comprise an indicator of an effect of a change in the one or more system components or configuration item on each logical group.

8. The apparatus of claim 1, wherein the change information is generated from an application coupled to a least one of the system component and the configuration item.

9. The apparatus of claim 1, wherein the configuration item is selected from a group consisting of a file, a registry, a database, and a virtual machine.

10. The apparatus of claim 1, wherein the change information comprises: a file creation, a file deletion, a file data, a registry creation, a registry deletion, a registry change value, a virtual machine setting change, a virtual machine setting value, a database change, a time of processing the change information, a program making the change information, an operational program making the change information, a reason for a change failure or a combination thereof.

11. A method comprising
generating change information for a configuration item associated with a system component; and
processing the change information according to an information structure, comprising:
a logical group associated with at least one of: the configuration item and the system component;
change rule information for the configuration item;
interrelationship information between the configuration item and a second configuration item;
change rule information for a system component;
interrelationship information between the configuration item and the system component;
interrelationship information between the system component and a second system component;
change rule information for the logical group; and
interrelationship information between the logical group and another logical group,
wherein the processing comprises a selected one of a group of activities, the group consisting of:
(a) monitoring configuration changes to the logical group;
(b) simulating a change to the configuration item according to the change information; and
(c) using the information structure to configure one or more change controllers to control changes to the configuration item according to the change information.

12. The method of claim 11, further comprising the step of generating a notification based on the processing of the change information according to the information structure.

13. The method of claim 12, wherein the notification comprises at least one of a report, an email, an SMS text message, a page, SNMP message, and an automated phone message.

14. The method of claim 11, wherein the change rule information for the configuration item comprises parameters for at least one or more of: an authorized user, an authorized program, a time window, and a data value.

15. The method of claim 11, wherein the interrelationship information between the configuration item and the system component, and the interrelationship information between the system component and the second system component includes an indicator of an effect of a configuration item change to the logical group.

16. The method of claim 11, wherein the configuration item is comprised of: one or more files, registries, databases, virtual machines, or a combination thereof.

17. The method of claim 11, wherein the change information is selected form a group consisting of: a file creation, a file deletion, a file data, a registry creation, a registry deletion, a registry change value, a virtual machine setting change, a virtual machine setting value, a database change, time of processing the change information, a program making the change information, and any combination thereof.

18. The method of claim 11, wherein the change information is provided by a change monitoring application coupled to at least one of: the configuration item and the system component.

19. The method of claim 11, wherein the change information further controls changes to configuration item in accordance with configuration parameters.

20. The method of claim 19, wherein the configuration parameters are determined from the information structure.

21. The method of claim 11, further comprising:
a. processing a plurality of logical group information structures associated with one or more logical groups, wherein the processing the plurality of logical group information structures comprises determining interrelationship information between each logical group, wherein each logical group information structure comprises
interrelationship information between the logical group and a second logical group; and
b. generating the information structure.

22. A method comprising:
generating simulated change information for a configuration item associated with a system component;
accessing an information structure, comprising:
a logical groups group associated with at least one of the configuration item and the system component
change rule information for the configuration item;
interrelationship information between the configuration item and a second configuration item;
change rule information for the system component;
interrelationship information between the configuration item and the system component;
interrelationship information between the system component and a second system component;
change rule information for the logical group; and
interrelationship information between the logical group and logical group; and
interpreting the simulated change information for the logical group according to the information structure, wherein the interpreting the simulated change information comprises a selected one of a group of activities, the group consisting of:
(a) determining if a configuration change according to the configuration change information violated a rule;
(b) interpreting change failures; and
(c) mapping a change in the configuration item to the system component.

* * * * *